(12) United States Patent
Nagaraj et al.

(10) Patent No.: US 6,933,062 B2
(45) Date of Patent: Aug. 23, 2005

(54) ARTICLE HAVING AN IMPROVED PLATINUM-ALUMINUM-HAFNIUM PROTECTIVE COATING

(75) Inventors: Bangalore Aswatha Nagaraj, West Chester, OH (US); Jeffrey Lawrence Williams, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 09/931,347

(22) Filed: Aug. 16, 2001

(65) Prior Publication Data

US 2003/0044633 A1 Mar. 6, 2003

(51) Int. Cl.$^7$ .............................. B32B 15/04; F03B 3/12
(52) U.S. Cl. ....................... 428/670; 428/632; 428/650; 428/610; 428/336; 416/241 R
(58) Field of Search ................................ 428/632, 650, 428/655, 656, 660, 661, 670, 469, 697, 699, 702, 610, 336; 416/241 R, 241 B

(56) References Cited

U.S. PATENT DOCUMENTS

| | | | |
|---|---|---|---|
| 5,658,614 A | | 8/1997 | Basta et al. |
| 5,667,663 A | | 9/1997 | Rickerby et al. |
| 5,716,720 A | | 2/1998 | Murphy |
| 5,942,337 A | | 8/1999 | Rickerby et al. |
| 5,989,733 A | | 11/1999 | Warnes et al. |
| 6,066,405 A | * | 5/2000 | Schaeffer |
| 6,190,471 B1 | | 2/2001 | Darolia et al. |
| 6,344,282 B1 | * | 2/2002 | Darolia et al. |

* cited by examiner

Primary Examiner—Jennifer McNeil
(74) Attorney, Agent, or Firm—McNees Wallace & Nurick LLC

(57) ABSTRACT

An article protected by a protective coating has a substrate and a protective coating having an outer layer deposited upon the substrate surface and a diffusion zone formed by interdiffusion of the outer layer and the substrate. The protective coating includes platinum, aluminum, no more than about 2 weight percent hafnium, and substantially no silicon. The outer layer is substantially a single phase.

9 Claims, 6 Drawing Sheets

ARTICLE HAVING AN IMPROVED PLATINUM-ALUMINUM-HAFNIUM PROTECTIVE COATING

STATEMENT REGARDING FEDERALLY SPONSORED RESEARCH OR DEVELOPMENT

The invention herein described was made in the performance or work under a NASA contract and is subject to the provisions of Section 305 of the National Aeronautics and Space Act of 1958, Public Law 85-568 (72 Stat. 435; 42 USC 2457).

This invention relates to a protective coating on an article made of a material such as a nickel-base superalloy and, more particularly, to a modified platinum-aluminum protective coating.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

The hotter the combustion and exhaust gases, the more efficient is the operation of the jet engine. There is thus an incentive to raise the combustion and exhaust-gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

Many approaches have been used to increase the operating temperature limits of turbine blades, turbine vanes, and other hot-section components to their current levels. For example, the composition and processing of the base materials themselves have been improved, and a variety of solidification techniques have been developed to take advantage of oriented grain structures and single-crystal structures. Physical cooling techniques may also be used.

The surfaces of the articles may be protected with an aluminum-containing protective coating, whose surface oxidizes to an aluminum oxide scale that inhibits further oxidation of the surfaces. The aluminum-containing protective coating may be a simple diffusion aluminide, a modified diffusion aluminide, or an overlay coating. The modified diffusion aluminides, having a protective layer including aluminum and at least one intentionally added modifying element, are widely used. A particularly useful modified diffusion aluminide is a platinum aluminide, wherein a platinum layer is deposited upon the substrate surface, an aluminum layer is deposited overlying the platinum layer, and the two deposited layers are interdiffused with each other and with the material of the substrate.

Platinum aluminides have been effective in testing and service. However, there is always a need to increase the performance of such protective coatings. The present invention fulfills this need, and further provides related advantages.

BRIEF SUMMARY OF THE INVENTION

The present invention provides an article protected by a protective layer. The protective layer may be applied by techniques comparable with those used to apply other protective layers, but it affords improved life-duration performance in the severe environments of the hot sections of gas turbine engines. The protective layer may be used as a bond coat for a thermal barrier coating, or by itself as an environmental coating.

An article, such as a component of a gas turbine engine, protected by a protective coating comprises a substrate, such as a nickel-base alloy, having a substrate surface, and a protective coating comprising an outer layer deposited upon the substrate surface and having a protective-coating outer surface, and a diffusion zone formed by interdiffusion of the outer layer and the substrate. The outer layer comprises platinum, aluminum, no more than about 2 weight percent hafnium, substantially no added silicon, and elements diffused into the protective coating from the substrate, and is substantially a single phase. A ceramic thermal barrier coating may overlie and contact the protective coating.

In some embodiments, the protective coating has an average hafnium composition profile comprising from about 0.1 to about 0.5 weight percent hafnium averaged over locations from the protective-coating outer surface to a depth of about 5 micrometers below the protective-coating outer surface, and from about 1 to about 9 (preferably from about 1 to about 6) weight percent hafnium averaged over locations from about 10 micrometers below the protective-coating outer surface to about 50 micrometers below the protective-coating outer surface. Preferably the protective coating has an average platinum composition comprising from about 20 to about 30 weight percent platinum averaged over locations from about 10 micrometers below the protective coating outer surface to about 20 micrometers below the protective coating outer surface. Preferably, the protective coating has an average aluminum composition comprising from about 15 to about 25 weight percent aluminum averaged over locations from about 10 micrometers below the protective coating outer surface to about 20 micrometers below the protective coating outer surface.

The present approach produces a protective coating that has a greater life in simulated engine fatigue cycle testing than other comparable coatings. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
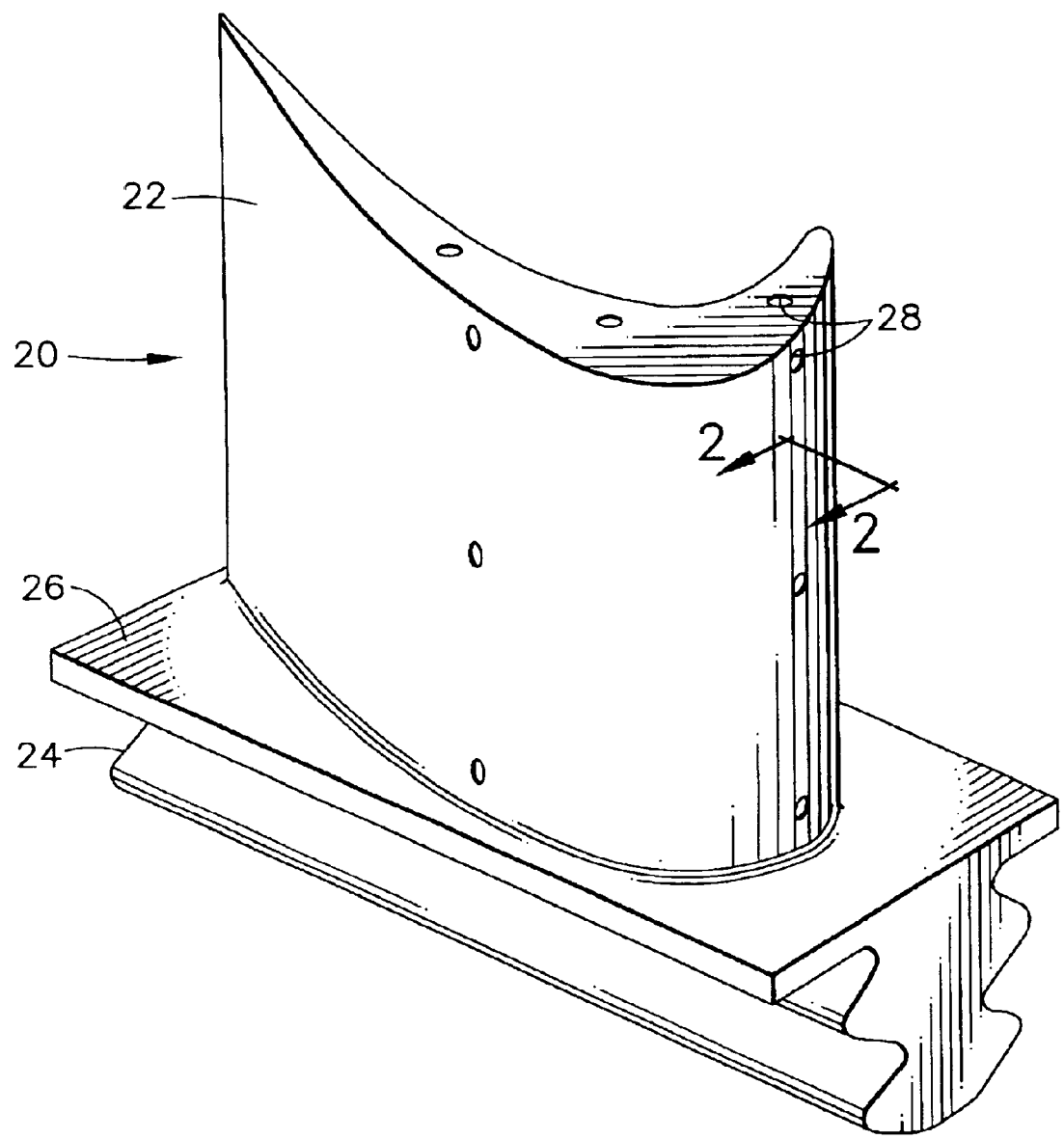
FIG. 1 is a perspective view of a gas turbine blade article having an airfoil structure.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane or nozzle has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal passages extend through the interior of the airfoil 22, ending in openings 28 in the surface of the airfoil 22. During service, a flow of cooling air is directed through the internal passages to reduce the temperature of the airfoil 22.

Figure 2:
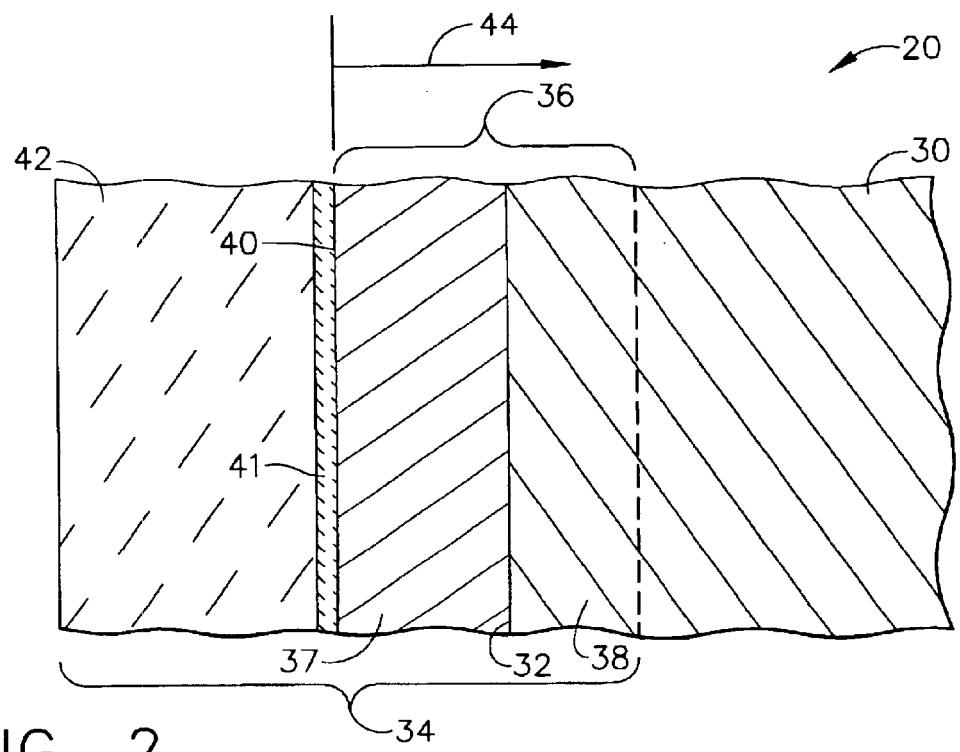
FIG. 2 is a schematic sectional view through the airfoil structure of FIG. 1, taken on lines 2—2.

FIG. 2 is a schematic sectional view, not drawn to scale, through a portion of the turbine blade 20, here the airfoil section 22. The turbine blade 20 has a body that serves as a substrate 30 with a surface 32. Overlying and contacting the surface 32 of the substrate 30, and also extending downwardly into the substrate 30, is a protective structure 34 including a protective coating 36 having an outer layer 37 which is a single-phase layer comprising platinum, aluminum, and hafnium and overlies the surface 32. The process that deposits the outer layer 37 onto the surface 32 of the substrate 30 is performed at elevated temperature, so that during deposition the material of the outer layer 37 interdiffuses into and with the material of the substrate 30, forming a diffusion zone 38. The diffusion zone 38, indicated by a dashed line in FIG. 2, is a part of the protective coating 36 but extends downward into the substrate 30. The protective coating 36 has an outwardly facing protective-coating outer surface 40 remote from the surface 32 of the substrate 30. An aluminum oxide scale 41 forms by oxidation of the aluminum in the protective coating 36 at the protective-coating outer surface 40. Optionally but shown in FIG. 2, a thermal barrier coating 42 may overlie and contact the protective-coating outer surface 40 and the aluminum oxide scale 41 thereon.

The outer layer 37, which is typically from about 20 micrometers to about 40 micrometers thick, comprises platinum, aluminum, no more than about 2 weight percent hafnium, substantially no added silicon, and elements diffused into the protective coating from the substrate. "No added silicon" means that silicon is not intentionally added during the deposition process that deposits the outer layer 37, but there may be some minor amount of silicon present as a result of diffusion from the substrate 30.

Figure 3:
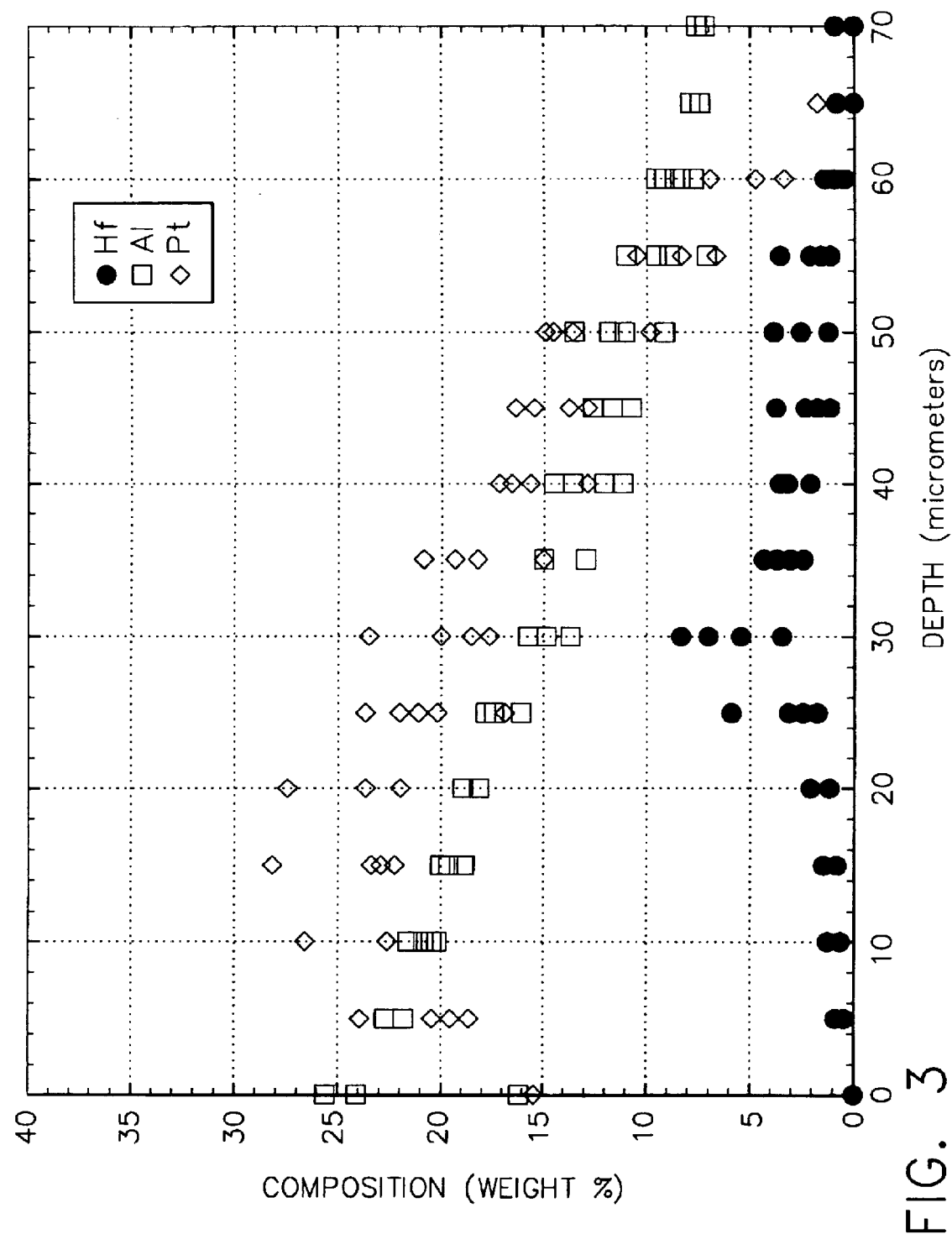
FIG. 3 is a compositional profile as a function of depth below the protective-coating outer surface.

FIG. 3 presents compositional profiles for four specimens prepared by the preferred deposition process. These compositional profiles are measured from the protective-coating outer surface 40 and downwardly into the protective coating 36, as indicated by arrow 44 of FIG. 2. The protective coating 36 has an average hafnium composition profile comprising from about 0.1 to about 0.5 weight percent hafnium averaged over locations from the protective-coating outer surface to a depth of about 5 micrometers below the protective-coating outer surface, and from about 1 to about 9, more preferably from about 1 to about 6, weight percent hafnium averaged over locations from about 10 micrometers below the protective-coating outer surface 40 to about 50 micrometers below the protective-coating outer surface 40. That is, there is a small average hafnium content near to the protective-coating outer surface 40, and a much larger average hafnium content at greater depths. At even greater depths beyond about 50 micrometers, the hafnium content again falls toward the value of, and eventually reaching, the hafnium content of the substrate 30. Stated another way, the protective coating 36 has an average hafnium composition profile comprising a relatively small first concentration of hafnium adjacent to the protective-coating outer surface 40, a relatively large second concentration (but not exceeding about 9 weight percent) of hafnium at greater depths below the protective-coating outer surface 40, and a relatively small third concentration of hafnium at yet greater depths below the protective-coating outer surface 40. As used here, the first concentration of hafnium is "relatively small" compared to the "relatively large" second concentration of hafnium, and the "third concentration" of hafnium is "relatively small" compared to the "relatively large" second concentration of hafnium. The first concentration of hafnium and the third concentration of hafnium are each smaller than the second concentration of hafnium, but the first concentration of hafnium and the third concentration of hafnium may be the same as each other or different.

The low hafnium content in the protective coating 36 near to the protective coating outer surface 40 is necessary. If the hafnium content in the near-surface region extending to a depth of about 5 micrometers is greater than about 0.5 weight percent, the hafnium oxidizes rapidly and forms hafnium oxide rich scale which leads to early spallation of the thermal barrier coating. The higher average hafnium content in the range of from about 10 micrometers to about 50 micrometers below the protective-coating outer surface 40 strengthens the protective coating 36. If the hafnium content in the range of from about 10 micrometers to about 50 micrometers below the protective-coating outer surface 40 is less than about 1 weight percent, the strength of the protective coating 36 is insufficient for the present purposes. If the hafnium content in the range of from about 10 micrometers to about 50 micrometers below the protective-coating outer surface 40 is greater than about 9 weight percent, there is a tendency to getter too much sulfur resulting in spallation.

The platinum and aluminum contents may be any operable values. However, as seen from FIG. 3, preferably the protective coating 36 has an average platinum composition comprising from about 20 to about 30 weight percent platinum averaged over locations from about 10 micrometers below the protective coating outer surface to about 20 micrometers below the protective coating outer surface. Preferably the protective coating 36 has an average aluminum composition comprising from about 15 to about 25 weight percent aluminum averaged over locations from about 10 micrometers below the protective coating outer surface to about 20 micrometers below the protective coating outer surface. The protective coating remains operable but with reduced performance for platinum and aluminum contents outside of these ranges.

The outer layer 37 is substantially a single phase. Second phases in conventional platinum-aluminum layers may be of two types. First, they may result from phase separations into multiple phases, such as the $PtAl_2$/(NiPt)Al phases found in some platinum-aluminum structures. Second, they may involve relatively small volume fractions of precipitates such as hafnium-silicides or the like formed when a significant amount of the precipitate-forming phase such as silicon is present in the coating. Both of these types of phase structures may lead to brittleness of the coating, and therefore both of these types of phase structures are excluded from the scope of the present invention by the phrase "single phase". In metallurgical practice, it is difficult to completely exclude all vestiges of second phases from a structure. The phrase "substantially a single phase" is therefore used to mean that the amount of second phase must be less than about 10 percent by volume of the outer layer 37, more preferably is less than about 2 percent by volume of the outer layer, and most preferably is 0 percent by volume of the outer layer. There will, of course, be second phases present in the diffusion zone 38 in most cases, as the substrate 30 is typically a nickel-base superalloy strengthened by refractory carbides in regions nearer to the surface 32 and by gamma prime precipitates in regions further from the surface 32.

The optional ceramic thermal barrier coating 42, where present, is preferably from about 0.003 to about 0.010 inch thick, most preferably about 0.005 inch thick. The ceramic thermal barrier coating 42 is preferably yttria-stabilized zirconia, which is zirconium oxide containing from about 2 to about 12 weight percent, preferably from about 4 to about 8 weight percent, of yttrium oxide. Other operable ceramic materials may be used as well. The ceramic thermal barrier coating 42 may be deposited by any operable technique, such as electron beam physical vapor deposition or plasma spray.

Figure 4:
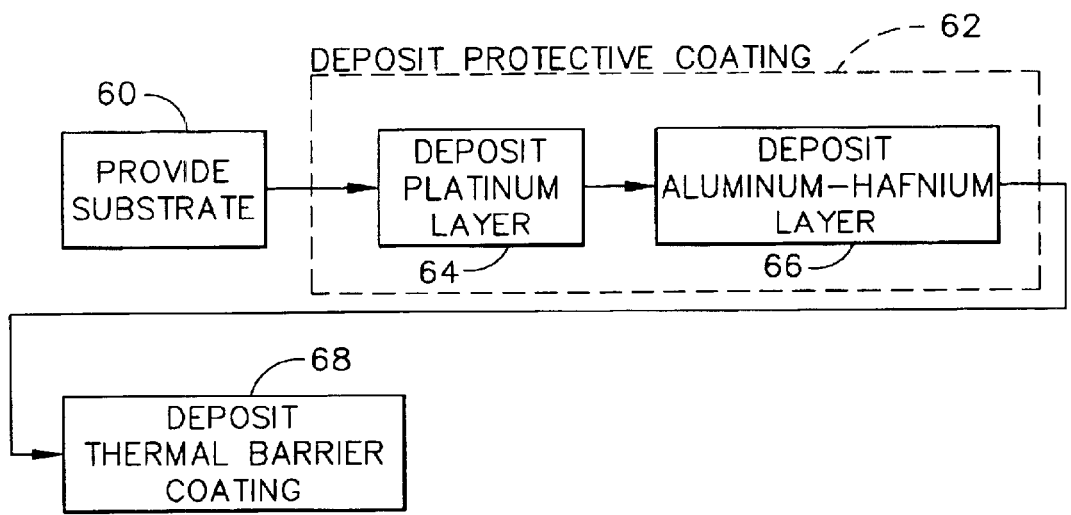
FIG. 4 is a block diagram illustrating a preferred approach for preparing the article of FIG. 1.

FIG. 4 is a block flow diagram of a preferred method for practicing the invention. An article and thence the substrate 30 is provided, numeral 60. The article is preferably a component of a gas turbine engine such as a gas turbine blade 20 or vane (or "nozzle", as the vane is sometimes called). The article is preferably a single crystal article. The article is most preferably made of a nickel-base superalloy. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The protective coating 36 is applied, numeral 62. A platinum-containing layer is first deposited onto the surface 32 of the substrate 30, numeral 64. The platinum-containing layer is preferably deposited by electrodeposition. For the preferred platinum deposition, the deposition is accomplished by placing a platinum-containing solution into a deposition tank and depositing platinum from the solution onto the surface 32 of the substrate 30. An operable platinum-containing aqueous solution is $Pt(NH_3)_4HPO_4$ having a concentration of about 4–20 grams per liter of platinum, and the voltage/current source is operated at about ½–10 amperes per square foot of facing article surface. The platinum-containing layer, which is preferably from about 1 to about 6 micrometers thick and most preferably about 5 micrometers thick, is deposited in 1–4 hours at a temperature of 190–200° F.

A layer comprising aluminum and hafnium (but not silicon) is deposited over the platinum-containing layer by any operable approach, numeral 66, with chemical vapor deposition preferred. In that approach, a hydrogen halide activator gas, such as hydrogen chloride, is contacted with aluminum metal or an aluminum alloy to form the corresponding aluminum halide gas. A hafnium halide is formed by the same technique, and mixed with the aluminum halide. Hafnium halide gas is mixed with the aluminum halide gas in the desired proportion. The mixture of aluminum halide and hafnium halide gas contacts the platinum-containing layer that overlies the substrate 30, depositing the aluminum thereon. The deposition occurs at elevated temperature such as from about 1825° F. to about 1975° F. so that the deposited aluminum atoms interdiffuse into the substrate 30 during a 4 to 20 hour cycle.

The ceramic thermal barrier coating 42 is optionally applied, numeral 68. The application of the ceramic thermal barrier coating is preferably accomplished by electron beam physical vapor deposition or plasma spray.

Figure 5:
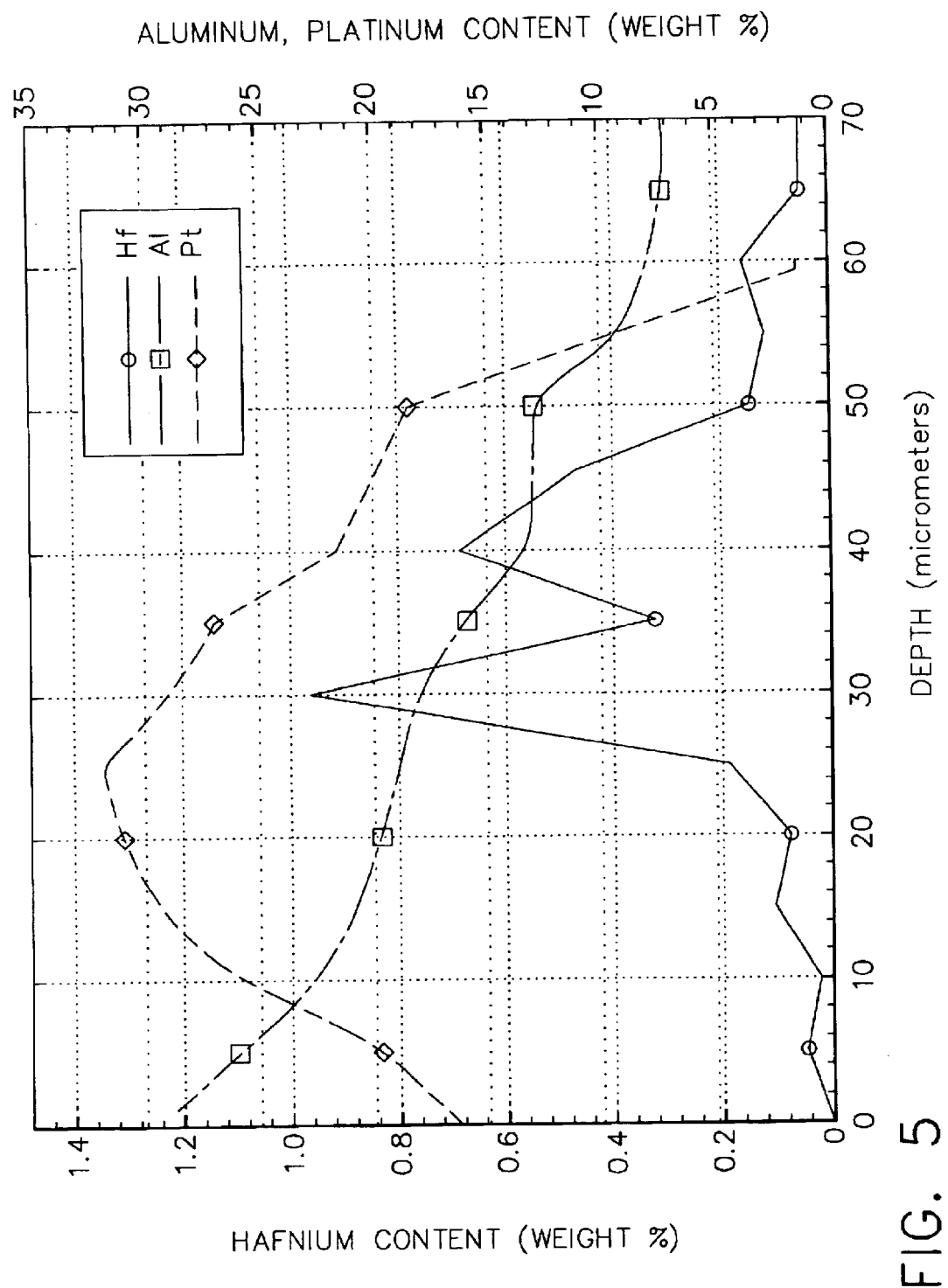
FIGS. 5–7 are compositional profiles like that of FIG. 3, for articles not within the scope of the invention.
Figure 6:
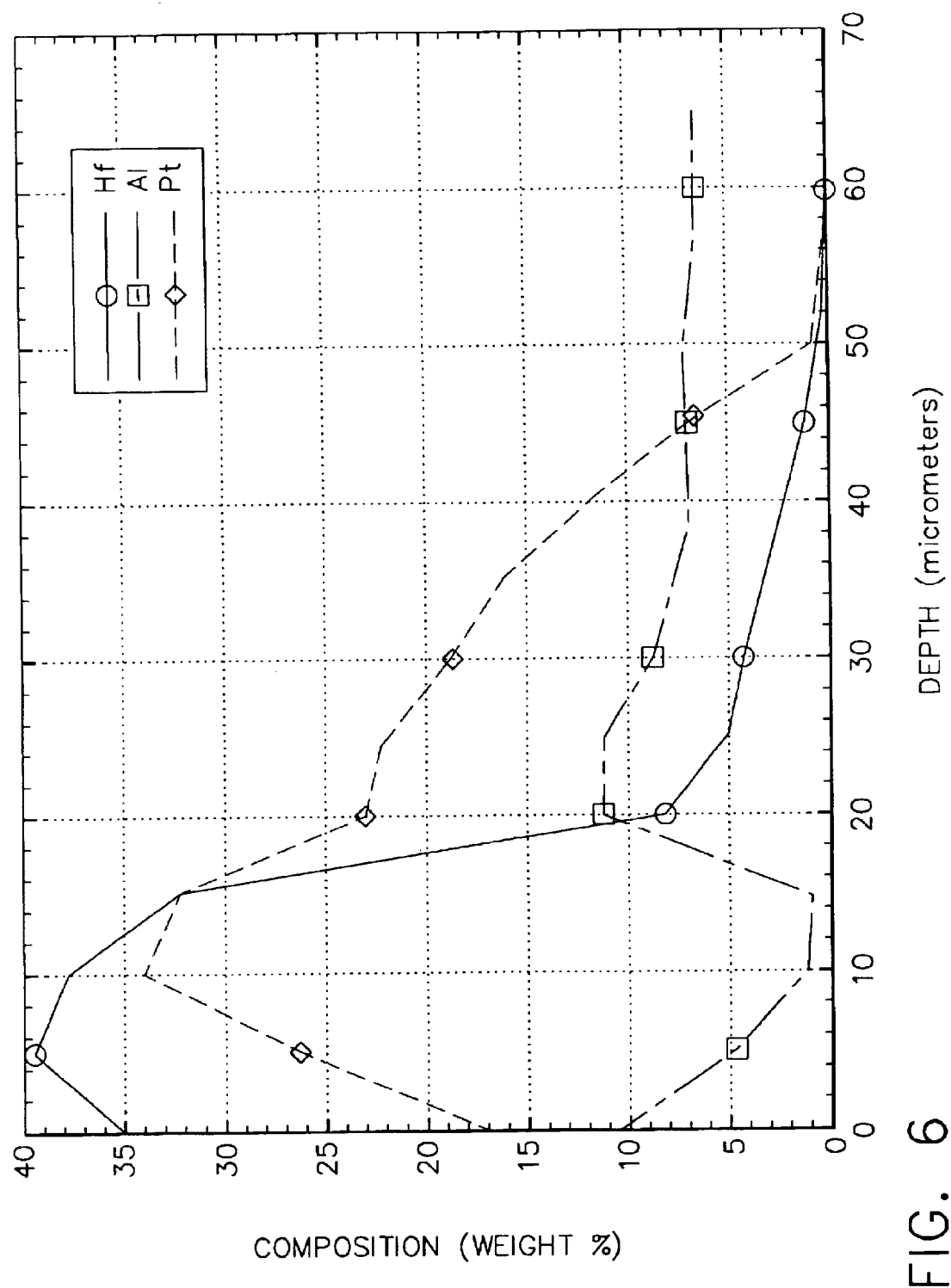
Figure 7:
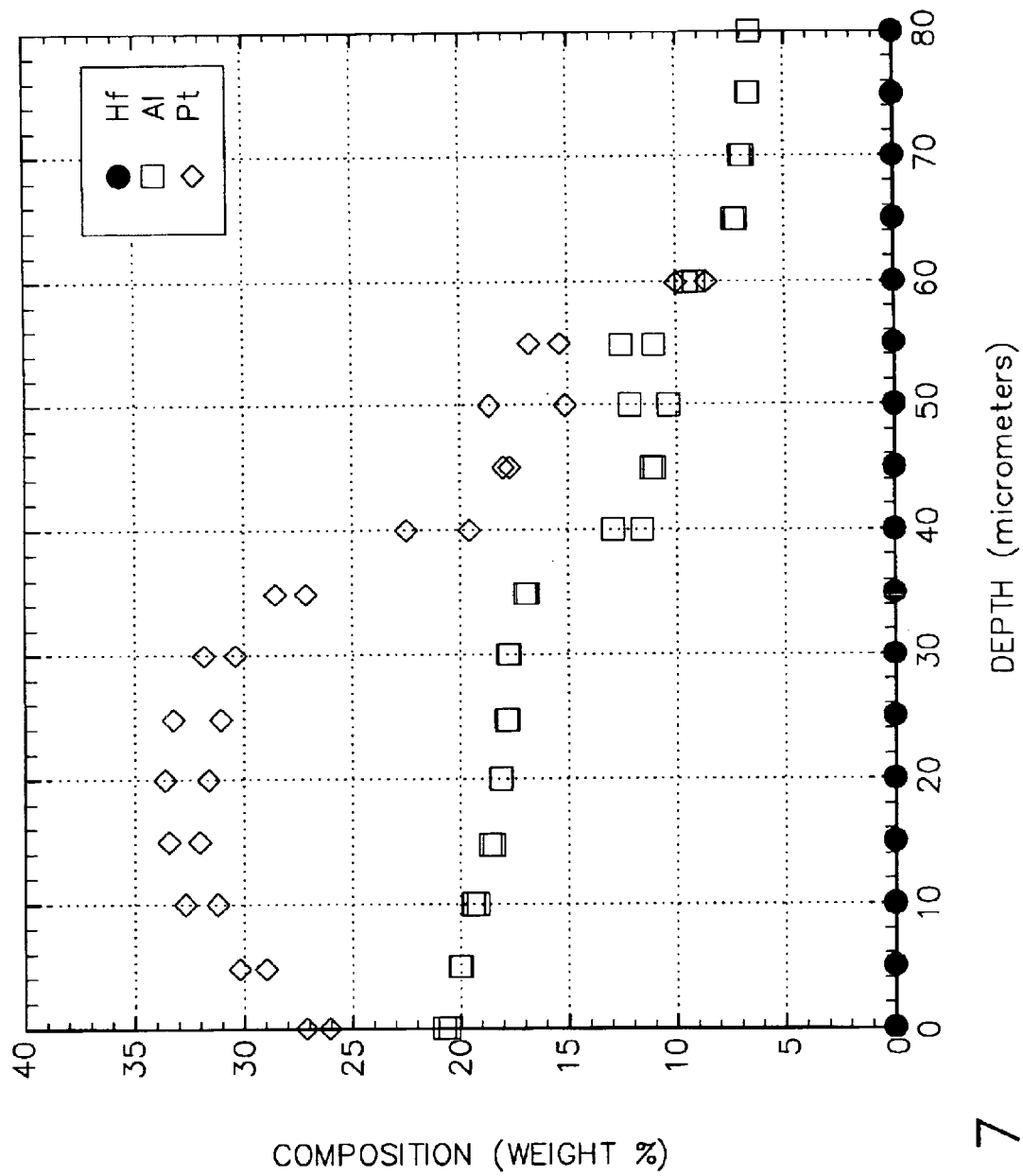

The present invention has been reduced to practice with comparisons between the present approach and other approaches. FIG. 3 presents compositional profiles for specimens that are within the scope of the invention prepared by chemical vapor deposition. FIGS. 5–7 present compositional profiles for other hafnium-containing specimens that are not within the scope of the invention. FIG. 7 presents the results for a baseline specimen with no hafnium present. (In FIGS. 3 and 5–7, not all data points are shown by their symbols to avoid clutter.) The specimens were oxidation tested in a furnace cycle test (FCT) in which each cycle included heating the specimen to a temperature of 2125° F. in 9 minutes, holding the specimen at that temperature for 45 minutes, and cooling the specimen to room temperature in 15 minutes. Failure was judged to be when 20 percent of the ceramic thermal barrier coating 42 had spalled. The following table presents illustrative comparative FCT test results, drawn from a larger body of data:

| Specimen | No. FCT Cycles to Failure |
|---|---|
| Figure 3 | 818 +/- 186 |
| Figure 5 | 416 +/- 35 |
| Figure 6 | 98 +/- 87 |
| Figure 7 | 240 |

The processing of FIG. 5 left the hafnium content too low in the depth range of 10 to 50 micrometers. The processing of FIG. 6 left the hafnium content too high in the depth range below 5 micrometers. The processing of FIG. 7 was without any hafnium. The results obtained with these and other specimens led to the determinations of the scope of the present invention.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article protected by a protective coating, comprising:
    a substrate having a substrate surface; and
    a protective coating comprising an outer layer deposited upon the substrate surface and having a protective-coating outer surface, and a diffusion zone formed by interdiffusion of the outer layer and the substrate, wherein
        the outer layer comprises platinum, aluminum, no more than about 2 weight percent hafnium, elements diffused into the protective coating from the substrate, and substantially no added silicon, and wherein
    the protective coating has an average hafnium composition profile comprising
        a relatively small first concentration of hafnium in a first depth range adjacent to the protective-coating outer surface,
        a relatively large second concentration of hafnium, but not exceeding about 9 weight percent, in a second depth range at greater depths than the first depth range below the protective-coating outer surface, and
        a relatively small third concentration of hafnium In a third depth range at yet greater depths than the second depth range below the protective-coating outer surface.

2. An article protected by a protective coating, comprising:
    a substrate having a substrate surface; and
    a protective coating comprising an outer layer deposited upon the substrate surface and having a protective-coating outer surface, and a diffusion zone formed by interdiffusion of the outer layer and the substrate, wherein
        the outer layer comprises platinum, aluminum, no more than about 2 weight percent hafnium, elements diffused into the protective coating from the substrate, and substantially no added silicon, wherein
        the outer layer is substantially a single phase, and wherein
        the protective coating has an average hafnium composition profile comprising
            from about 0.1 to about 0.5 weight percent hafnium averaged over locations from the protective-coating outer surface to a depth of about 5 micrometers below the protective-coating outer surface, and
            from about 1 to about 9 weight percent hafnium averaged over locations from about 10 micrometers below the protective-coating outer surface to about 50 micrometers below the protective-coating outer surface.

3. An article protected by a protective coating, comprising: a substrate having a substrate surface; and
    a protective coating comprising an outer layer deposited upon the substrate surface and having a protective-coating outer surface, and a diffusion zone formed by interdiffusion of the outer layer and the substrate, wherein
        the outer layer comprises platinum, aluminum, hafnium, elements diffused into the protective coating from the substrate, and substantially no added silicon, and wherein the protective coating has an average hafnium composition profile comprising
            from about 0.1 to about 0.5 weight percent hafnium averaged over locations from the protective-coating outer surface to a depth of about 5 micrometers below the protective-coating outer surface, and
            from about 1 to about 9 weight percent hafnium averaged over locations from about 10 micrometers below the protective-coating outer surface to about 50 micrometers below the protective-coating outer surface, and wherein
        the outer layer is substantially a single phase.

4. The article of claim 3, wherein the substrate is a nickel-base alloy.

5. The article of claim 3, wherein the article is a component of a gas turbine engine.

6. The article of claim 3, wherein the protective coating has an average hafnium composition profile comprising
- from about 0.1 to about 0.5 weight percent hafnium averaged over locations from the protective-coating outer surface to a depth of about 5 micrometers below the protective-coating outer surface, and
- from about 1 to about 6 weight percent hafnium averaged over locations from about 10 micrometers below the protective-coating outer surface to about 50 micrometers below the protective-coating outer surface.

7. The article of claim 3, wherein the protective coating has an average platinum composition comprising from about 20 to about 30 weight percent platinum averaged over locations from about 10 micrometers below the protective coating outer surface to about 20 micrometers below the protective coating outer surface.

8. The article of claim 3, wherein the protective coating has an average aluminum composition comprising from about 15 to about 25 weight percent aluminum averaged over locations from about 10 micrometers below the protective outer coating outer surface to about 20 micrometers below the protective coating outer surface.

9. The article of claim 3, further including
- a ceramic thermal barrier coating overlying and contacting the protective-coating outer surface.

* * * * *

UNITED STATES PATENT AND TRADEMARK OFFICE
CERTIFICATE OF CORRECTION

PATENT NO. : 6,933,062 B2
DATED : August 23, 2005
INVENTOR(S) : Nagaraj et al.

It is certified that error appears in the above-identified patent and that said Letters Patent is hereby corrected as shown below:

Column 8,
Line 13, "In" should be -- in --.

Signed and Sealed this

Seventh Day of February, 2006

JON W. DUDAS
*Director of the United States Patent and Trademark Office*